United States Patent
Chang et al.

[11] Patent Number: 6,072,002
[45] Date of Patent: *Jun. 6, 2000

[54] WEATHERABLE RESINOUS COMPOSITION

[75] Inventors: Moh Ching Oliver Chang, Leverkusen, Germany; Richard M. Auclair, Westfield, Mass.

[73] Assignee: Bayer Corporation, Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/955,857

[22] Filed: Oct. 21, 1997

[51] Int. Cl.⁷ ............................. C08L 51/00; C08L 51/04
[52] U.S. Cl. ................... 525/73; 525/71; 525/75; 525/78; 525/80; 525/86; 525/316
[58] Field of Search ................. 525/73, 71, 78, 525/80, 86, 316, 75

[56] References Cited

U.S. PATENT DOCUMENTS

| | | |
|---|---|---|
| 3,055,859 | 9/1962 | Vollmert . |
| 3,691,260 | 9/1972 | Mittnacht et al. . |
| 3,879,496 | 4/1975 | Paxton ............... 525/193 |
| 4,224,419 | 9/1980 | Swoboda et al. ............... 525/71 |
| 4,897,449 | 1/1990 | Gaillard et al. ............... 525/85 |

FOREIGN PATENT DOCUMENTS

| | | |
|---|---|---|
| 534212 | 3/1993 | European Pat. Off. . |
| 1124911 | 8/1968 | United Kingdom . |

*Primary Examiner*—Mark L. Warzel
*Attorney, Agent, or Firm*—Joseph C. Gil; Aron Preis

[57] ABSTRACT

A thermoplastic molding composition which features improved impact and flow properties as well as reduced opacity is disclosed. The composition contains (A) 15 to 50 percent of a grafted rubber which contains (a) a crosslinked rubber substrate which contains, as a core, about 1 to 25% relative to its weight of at least one vinylaromatic polymer, and (b) a grafted phase, and (B) 85 to 50 percent of a copolymeric matrix.

The composition, which contains no additional grafted rubber components, is also characterized in that (i) the substrate amounts to 60 to 90 percent, and grafted phase amounts to 40 to 10 percent, relative to the weight of the grafted rubber and that (ii) the grafted rubber has a monomodal size distribution and that (iii) the grafted rubber has a weight average particle size of about 0.2 to 1.0 microns.

14 Claims, No Drawings

WEATHERABLE RESINOUS COMPOSITION

The invention concerns a thermoplastic molding composition and more particularly a composition which contains grafted rubber.

SUMMARY OF THE INVENTION

A thermoplastic molding composition which features improved impact and flow properties as well as reduced opacity is disclosed. The composition contains (A) 15 to 50 percent of a grafted rubber which contains (a) a crosslinked rubber substrate which contains, as a core, about 1 to 25% relative to its weight of at least one vinylaromatic polymer, and (b) a grafted phase, and (B) 85 to 50 percent of a copolymeric matrix.

The composition, which contains no additional grafted rubber components, is also characterized in that (i) the substrate amounts to 60 to 90 percent, and grafted phase amounts to 40 to 10 percent, relative to the weight of the grafted rubber and that (ii) the grafted rubber has a monomodal size distribution and that (iii) the grafted rubber has a weight average particle size of about 0.2 to 1.0 microns.

BACKGROUND OF THE INVENTION

It has long been known that thermoplastically processable styrene/acrylonitrile copolymers (SAN) may be imparted improved impact properties by the incorporation of rubbers. In ABS polymers, diene polymers are used as the rubbers for toughening, most notably at low temperatures; however, the relatively poor weathering and aging resistance make these materials less favored in more demanding applications. In some such applications, use has successfully been made of crosslinked acrylic acid ester polymers; these are the well known ASA copolymers. Such have been described in U.S. Pat. No. 3,055,859 and in German Patents 1,260,135 and 1,911,882. Accordingly, the preferably crosslinked, rubbery acrylic acid ester polymer which serves as the grafting base (substrate) is first prepared by emulsion polymerization and the latex thus prepared is then grafted, preferably by emulsion, with a mixture of styrene and acrylonitrile. The art thus has long recognized that improved impact strength, notched Izod, greater hardness and reduced shrinkage are associated with such ASA products which have as a grafting base a coarse polyacrylate latex having a mean particle diameter of about 150 to 800 nm and a narrow particle size distribution. Also, noted in the present context is the disclosure in U.S. Pat. No. 4,224,419 which disclosed an ASA based composition which contains two different graft copolymers of SAN onto crosslinked acrylates, and a hard copolymeric SAN component.

The art refers to "hard" and "soft" segments in terms of the relative position of their glass transition temperature vis a vis room temperature. "Hard" means $T_g$ above room temperature and "soft" means below room temperature, as well as to core/shell structures including structures which contain a multiplicity of shells. Multi-phase structured emulsion copolymers, including hard-soft and hard morphologies have been disclosed in EP 534,212 and in the documents referenced therein. Accordingly, graft copolymers with a hard core of polystyrene, a first butyl acrylate shell and an outer SAN shell have been disclosed in the art. Significantly, the '212 document disclosed a monomodal system containing particles having a styrene core and measuring less than 0.2 microns.

DETAILED DESCRIPTION OF THE INVENTION

The inventive thermoplastic composition comprises:

(A) 15 to 50 percent, relative to the total weight of A and B, of a grafted rubber and (B) 85 to 50 percent, relative to the total weight of A and B of a matrix containing a copolymer of at least one monomer selected from a first group consisting of styrene, α-methyl styrene, ring-halogenated styrene and ring-alkylated styrene and at least one monomer selected from a second group consisting of (meth) acrylonitrile, methyl methacrylate and maleic anhydride. The weight ratio between said monomer(s) of said first group to said monomer(s) of said second group of 80:20 to about 65:35.

The grafted rubber includes a substrate and a phase grafted thereto (grafted phase). The relative weights of substrate and grafted phase making up component A are 50 to 90, preferably 65 to 85, percent of substrate and 10 to 50, preferably 15 to 35 of a grafted phase. The substrate contains 1 to 25, preferably 3 to 20, percent relative to the weight of the substrate, of a core (A1) and 99 to 75, preferably 97 to 80, percent relative to the weight of the substrate of a shell (A2) where (A1) denotes an optionally crosslinked core polymerized from at least one member selected from the group consisting of styrene, α-methyl styrene, ring-halogenated styrene and ring-alkylated styrene, and where (A2) denotes a crosslinked rubber shell enveloping said core, selected from the group consisting of alkyl acrylate, EPDM, EPM, vinyl acetate, hydrogenated diene and diene, said substrate being present in particulate form having a monomodal size distribution and a weight average particle size of about 0.2 to 1.0, preferably 0.25 to 0.6 microns.

The grafted phase (A3) contains a copolymer of at least one monomer selected from a first group consisting of styrene, α-methyl styrene, ring-halogenated styrene and ring-alkylated styrene, such as p-methylstyrene and tert.butylstyrene with at least one monomer selected from a second group consisting of (meth)acrylonitrile, methylmethacrylate and maleic anhydride. The weight ratio between said monomer(s) of said first group to said monomer(s) of said second group of 80:20 to about 65:35.

The inventive composition is further characterized in that it contains no additional grafted rubber components.

The composition according to the invention may contain conventional additives, in customary and effective amounts, which are known for their utility in thermoplastic elastomeric molding compositions.

The grafted rubber, component (A) of the inventive composition, may be prepared by graft copolymerization of at least one of styrene, α-methyl styrene, ring halogenated styrene, ring-alkylated styrene, such as p-methylstyrene and tert.butylstyrene with at least one of (meth)acrylonitrile, methylmethacrylate and maleic anhydride in the presence of the crosslinked, elastomeric core-shell substrate. Since 100% grafting yield cannot be achieved in the graft copolymerization, the polymerization product from the graft copolymerization always contains a proportion of free, non-grafted copolymer (for convenience, the grafted phase is referred to hereinafter in this text as "SAN"). However, for the purposes of the present invention, the term "graft copolymer" is only applied to the rubber to which SAN have actually been grafted. The proportion of the grafted SAN in the polymerization product from the graft copolymerization can be determined in the conventional manner by extracting the free, non-grafted SAN copolymer from the polymerization product, for example by methyl ethyl ketone, since the grafting base of the grafted rubber is crosslinked and the grafted copolymer is chemically bound to the graft base. The principles of the method of separation have been described by Moore, Moyer and Frazer, Appl. Polymer Symposia No. 7, page 67, et seq. (1968).

The degree of grafting, in the present context, refers to the percentage proportion, based on the total graft copolymer, of the SAN which is chemically bonded in the grafting branches of the graft copolymer. The degree of grafting may be calculated from the analytically determined composition of the gel which is insoluble in methyl ethyl ketone.

The particle size according to the invention is the weight-average particle size as determined by an ultracentrifuge, such as in accordance with the method of W. Scholtan and H. Lange, Kolloid-Z. und Z.-Polymere 250 (1972), 782–796. The ultracentrifuge measurement gives the integral mass distribution of the particle diameters of a sample. From this it is possible to determine that the percentage by weight of the particles have a diameter equal to or less than a certain size.

The graft rubber useful according to the invention, namely component (A), may be prepared in the conventional manner by methods which are well known in the art. The core polymer (A1) which is optionally crosslinked, may be prepared by conventional emulsion techniques which are well known in the art. The monomers to be employed are at least one member selected from the group consisting of styrene, α-methyl styrene, ring-halogenated styrene and ring-alkylated styrene, such as p-methylstyrene and tert.butylstyrene. Crosslinking may be attained by the incorporation of small amounts, usually about 0.5 to 10%, preferably 0.5 to 3%, relative to the weight of the core, of any of the polyfunctional monomeric cross-linking agents, which are well known in the art. Examples include tri allyl cyanurate, di allyl maleate and di vinyl benzene.

The rubber shell (A2) is crosslinked rubber, preferably an acrylic acid ester polymer having a glass transition temperature of below 0° C. Preferably, this temperature should be below –20° C., more particularly below –30° C. The glass transition temperature of the acrylic acid ester polymer may be determined by the DSC method (K. H. Illers, Makromol. Chemie 127 (1969), page 1). Suitable alkyl acrylates for the preparation of acrylic acid ester polymers are those where the alkyl has 2 to 8 carbon atoms, preferably 4 to 8 carbon atoms. Specific examples are n-butyl acrylate and ethylhexyl acrylate. The acrylic acid esters may be employed as individual compounds or as mixtures with one another. In the preparation of the substrate, the acrylic acid esters (or the other monomers making up the shell) are polymerized in the presence of the previously prepared core polymer (A1).

In order to obtain crosslinking of the preferred acrylic polymers, the polymerization is preferably carried out in the presence of from 0.5 to 10% by weight, preferably from 0.5 to 3% by weight, based on the total monomers employed for the preparation of the grafting bases, of a copolymerizable, polyfunctional, preferably trifunctional, monomer which effects crosslinking and subsequent grafting. Suitable bifunctional or polyfunctional crosslinking monomers are those which contain two or more, preferably three, ethylenic double bonds which are capable of copolymerization and are not conjugated in the 1,3-positions. Examples of suitable crosslinking monomers are divinylbenzene, diallyl maleate, diallyl fumarate and diallyl phthalate, triallyl cyanurate and triallyl isocyanurate. Grafting agents may optionally be included, including unsaturated monomers having epoxy, hydroxy, carboxyl, amino or acid anhydride groups, for example hydroxyalkyl (meth)acrylates.

The preparation of the graft copolymer (A) to be employed according to the invention may be carried out in accordance with the following method. The vinyl aromatic core particle (A1) is first prepared by polymerizing the vinyl aromatic monomer(s) to form a core particle (optionally crosslinked) in aqueous emulsion by conventional methods at from 20 to 100° C., preferably from 50 to 90° C. The conventional emulsifiers, for example alkali metal salts of alkyl sulfonic acids or alkyl aryl sulfonic acids, alkyl sulfates, fatty alcohol sulfonates, salts of higher fatty acids of 10 to 30 carbon atoms, or resin soaps, may be used. The sodium salts of alkyl sulfonic acids or the sodium salts of fatty acids of from 10 to 18 carbon atoms are preferred. Advantageously, the emulsifier is used in an amount of from 0 to 5% by weight, especially from 0 to 2% by weight, based on the monomer(s) employed to prepare the core polymer (A1). In general, a water:monomer ratio of from 50:1 to 0.7:1 is used. The polymerization initiators used are in particular the conventional persulfates, e.g., potassium persulfate, but redox systems can also be employed. In general, the initiator is used in an amount of from 0.1 to 1% by weight, based on the monomer(s) employed in the preparation of the core polymer (A1). Further polymerization additives which may be employed are the conventional buffers, to bring the pH to about 6 to 9, for example sodium bicarbonate and sodium pyrophosphate, and from 0 to 3% by weight of a molecular weight regulator, for example a mercaptan terpinol, or dimeric alpha-methyl styrene.

The precise polymerization conditions, such as the nature, rate of addition, and amount of the emulsifier initiator, and other additives, are selected, within the ranges referred to above so that the resulting latex of the optionally crosslinked vinyl aromatic core polymer attains the indicated particle size. The particle size distribution of the core particles is monomodal.

The preparation of the crosslinked rubber shell (A2) in the presence of the polyvinyl aromatic core particle to form the substrate according to the invention may be carried out in accordance with the following method. The shell (A2) is prepared by polymerizing the indicated monomers, for instance, acrylic acid ester or esters, and the polyfunctional crosslinking/graftlinking monomer, in aqueous emulsion by conventional methods at from 20 to 100° C., preferably from 50 to 80° C. The conventional emulsifiers, for example alkali metal salts of alkyl sulfonic acids or alkyl aryl sulfonic acids, alkyl sulfates, fatty alcohol sulfonates, salts of higher fatty acids of 10 to 30 carbon atoms, or resin soaps, may be used. The sodium salts of alkyl sulfonic acids or the sodium salts of fatty acids of from 10 to 18 carbon atoms are preferred. Advantageously, the emulsifier is used in an amount of from 0 to 5% by weight, especially from 0 to 2% by weight, based on the monomer(s) employed to prepare the crosslinked shell (A2). In general, a water-monomer ratio of from 5:1 to 0.7:1 is used. The polymerization initiators used are in particular the conventional persulfates, e.g., potassium persulfate, but redox systems can also be employed. In general, the initiator is used in an amount of from 0.1 to 1% by weight, based on the monomer(s) employed in the preparation of the crosslinked shell (A2). Further polymerization additives which may be employed are the conventional buffers, to bring the pH to about 6 to 9, for example sodium bicarbonate and sodium pyrophosphate, and from 0 to 3% by weight of a molecular weight regulator, for example a mercaptan, terpinol, or dimeric alpha-methyl styrene.

The precise polymerization conditions, such as the nature, rate of addition, and amount of the emulsifier initiator, and other additives, are selected, within the ranges referred to above, so that the resulting latex of the substrate attains the particle size required in accordance with the present invention. The particle size distribution of the core/shell graft base particles is monomodal.

To prepare the grafted rubber (A), a monomer system containing at least one monomer selected from a first group consisting of styrene, α-methyl styrene, ring-alkylated styrene, such as p-methylstyrene and tert.butylstyrene with at least one monomer selected from a second group consisting of (meth)acrylonitrile, methylmethacrylate and maleic anhydride (herein "SAN") is polymerized in the presence of the latex of crosslinked rubber, preferably acrylic acid ester polymer which contains about 1 to 25 percent relative to its weight of a polymer of vinyl aromatic monomer, preferably, styrene. The weight ratio between the monomer of said first group to said monomer of said second group is 80:20 to about 65:35.

It is advantageous if this graft copolymerization of the grafted phase onto the crosslinked rubber substrate is carried out in aqueous emulsion under the conventional conditions. The graft copolymerization may advantageously be carried out in the same system as the emulsion polymerization which is used to prepare the substrate, optionally with the further addition of emulsifier and initiator. The monomer system to be grafted onto the base, can be added to the reaction mixture all at once, in several stages or, preferably, continuously during the polymerization. The graft copolymerization of the mixture onto the crosslinked rubber substrate is conducted such that a degree of grafting of 10 to 50% by weight, preferably 20 to 40% by weight, in the grafted rubber (A) results. Since the grafting yield of the graft copolymerization is not 100%, it is necessary to employ a somewhat larger amount of the monomer mixture for the graft copolymerization than would correspond to the desired degree of grafting. The control of the grafting yield of the graft copolymerization, and hence the degree of grafting of the finished grafted rubber (A) is familiar to the art-skilled and is effected, inter alia, by the rate of addition of the monomers and by adding a molecular chain regulator (Chauvel and Daniel, ACS Polymer Preprints 15 (1974), 329 et seq.). The emulsion graft copolymerization in general produces about 10 to 25% by weight, based on the graft rubber, of free, non-grafted styrene/acrylonitrile copolymer. The proportion of the grafted rubber (A) in the polymerization product obtained from the graft copolymerization is determined in accordance with the method specified above.

The grafted phase in the grafted rubber (A) along with the non-grafted (free) polymer produced in the emulsion polymerization is recovered as dry solids from the liquid latex by the usual coagulation, washing, dewatering and drying techniques.

As discussed above, the composition in accordance with the invention contains a matrix (B) which includes a copolymer of at least one monomer selected from a first group consisting of styrene, α-methyl styrene, ring-halogenated styrene and ring-alkylated styrene and at least one monomer selected from a second group consisting of (meth) acrylonitrile, methyl methacrylate and maleic anhydride. The weight ratio between said monomer(s) of said first group to said monomer(s) of said second group is 80:20 to about 65:35. The free, non-grafted copolymer formed during the graft copolymerization for the preparation of the component (A) may also form part of the hard component (B). Depending on the conditions selected for the graft copolymerization to prepare the grafted rubber (A), it may be that a sufficient proportion of hard component (B) has already been formed during the graft copolymerization. In general, however, it is necessary to mix the products obtained from the graft copolymerization with additional, separately prepared hard component (B).

This additional, separately prepared hard component (B) is preferably a styrene/acrylonitrile copolymer, an α-methyl styrene/acrylonitrile copolymer or an α-methyl styrene/styrene/acrylonitrile terpolymer. These copolymers can be employed individually, or as mixtures with one another, as the hard component, so that the additional separately prepared hard component (B) of the composition according to the invention can, for example, be a mixture of a styrene/acrylonitrile copolymer and an α-methyl styrene/acrylonitrile copolymer. The hard component (B) may be obtained by conventional methods. Thus, the copolymerization of styrene and/or α-methyl styrene with acrylonitrile can be carried out by radical polymerization preferably mass polymerization, solution polymerization, suspension polymerization or aqueous emulsion polymerization. Preferably, the hard component (B) has a weight average molecular weight of about 50 to 250, preferably 80 to 150 Kg/mole.

The mixing of the components for the preparation of the inventive composition may be carried out conventionally by method and using equipment which are well known in the art. For instance, if the components have, for example, been prepared by emulsion polymerization, it is possible to mix the resulting polymer dispersions with one another, then to coprecipitate the polymers, and to work up the polymer mixture. Preferably, however, components (A) and (B) may be mixed by conjointly extruding, kneading or milling them, in which case the components must necessarily first be isolated from the solution or aqueous dispersion obtained by polymerization.

The composition may contain, as further components, any additive conventionally used, such as fillers, other compatible plastics, antistatic agents, antioxidants, flameproofing agents and lubricants. The additives may be used in conventional effective amounts, preferably of from 0.1 to a total of about 30% relative to the total weight of A+B.

The examples which follow illustrate the invention. In the examples, parts and percentages are by weight, unless stated otherwise.

EXAMPLES

The notched impact strength of the compositions was determined by the method of DIN 53,453 on injection-molded standard small bars at 23° C. These bars were injection molded at 250° C. or 280° C.

Experimental:

Compositions representative of the invention have been prepared and their properties determined. The results of the determinations are shown in the table below. In the preparation of the compositions the components were 33 percent by weight of component (A) and 67 percent of component (B). Components (A) the graft-rubber and component (B) the styrene/acrylonitrile matrix, are characterized as follows:
Component (A): a styrene core-containing grafted rubber where the graft substrate, 25 percent relative to the weight of the composition, contained styrene and butyl acrylate. The styrene content, noted as percent, relative to the weight of the graft substrate base, is the variable parameter. The grafted phase was SAN where the weight ratio of the components was 68/32. The rubber particles had a monomodal size distribution and the weight average particle size was 0.35 microns.

Component (B): styrene/acrylonitrile copolymer was substantially similar in its compositional makeup to the graft phase of component (A); its weight average molecular weight was 120 Kg/mole. In the comparative example designated comparative 1, component (A) was replaced by a SAN-grafted butyl acrylate which contained no styrene core. The butyl acrylate content in this composition was 25% relative to the weight of the composition. In the comparative example designated as Comparative 2, the styrene content, 30%, is outside the scope of the invention.

| Example | Comparative 1 | 1 | 2 | 3 | Comparative 2 |
|---|---|---|---|---|---|
| styrene content, % | 0 | 5 | 10 | 20 | 30 |
| MMP[i], psi | 698 | 638 | 638 | 595 | 580 |
| opacity[ii] | 99.5 | 98.9 | 98.5 | 98.2 | 97.1 |
| Yellowness Index[iii] | 33.2 | 30.8 | 31.4 | 30.3 | 31.4 |
| Impact properties Izod, at 23° C., J/m | | | | | |
| ⅛" | 106.0 | 198.8 | 158.4 | 123.6 | 77.1 |
| ½" | 89.4 | 131.5 | 117.8 | 94.7 | 63.1 |
| Izod at −30° C., J/m | | | | | |
| ⅛" | 37.3 | 39.3 | 40.6 | 34.8 | 21.7 |
| ½" | 33.3 | 64.1 | 51.6 | 41.6 | 29.7 |
| multiaxial impact[iv], J @room temperature | | | | | |
| $E_m$ | 15.5 | 19.8 | 19.3 | 19.4 | 15.4 |
| $E_f$ | 23.0 | 34.7 | 34.6 | 33.8 | 25.5 |
| @−30° C. | | | | | |
| $E_m$ | 2.6 | 9.1 | 5.8 | 4.8 | 0.5 |
| $E_f$ | 3.0 | 9.3 | 6.1 | 4.9 | 1.1 |

[i]MMP = minimum molding pressure
[ii]Determined by contrast ration as explained below
[iii]yellowness index as determined by ASTM D 1925.
[iv]determined in accordance with ASTM D 3763; $E_m$ denotes energy at maximum; $E_f$ denotes energy to failure.

The minimum molding pressure at the melt temperature of about 255° C. is indicative of the flow of the composition. The data points to the critical dependence of flow on the styrene content of the substrate. The Opacity was determined by the contrast ratio. The contrast ratio (CR) is a measure of opacity and is determined on a molded specimen measuring 3×4×0.1 inch. The determination entails measuring the reflectance first against a black background and again against a white background using a spectrophotometer (Applied Color System; using IIIuminant D65 at a 10 degree observer angle). The Y-tristimulus values are calculated based on the three instrument-measured CIE (International Commission on Illumination) L*, a* and b* values. The contrast ratio (CR) is determined as $$CR = 100 \times Y_{(against\ black)} / Y_{(against\ white)}$$

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (A) 15 to 50 percent, relative to the total weight of A and B, of a grafted rubber and
   (B) 85 to 50 percent, relative to the total weight of A and B of a matrix containing a copolymer of at least one monomer selected from a first group consisting of styrene, α-methyl styrene, ring-halogenated styrene and ring-alkylated styrene and at least one monomer selected from a second group consisting of (meth) acrylonitrile, methyl methacrylate and maleic anhydride wherein weight ratio between said monomer of said first group to said monomer of said second group is in the range of 80:20 to about 65:35,
   said grafted rubber including a substrate and a grafted phase wherein said substrate and grafted phase relate one to the other, by weight, as 50:50 to 90:10, said substrate containing 5 to 20 percent, relative to the weight of the substrate, of a core (A1), and 95 to 80 percent relative to the weight of the substrate of a shell (A2), where (A1) is a core polymerized from at least one member selected from the group consisting of styrene, α-methyl styrene, ring-halogenated styrene and ring-alkylated styrene, and where (A2) denotes a crosslinked rubber shell enveloping said core, selected from the group consisting of alkyl acrylate, EPDM, EPM, and vinyl acetate, said substrate being present in particulate form having a monomodal size distribution and a weight average particle size of about 0.2 to 1.0 microns, and where grafted phase contains a copolymer of at least one monomer selected from a third group consisting of styrene, α-methyl styrene, ring-halogenated styrene and ring-alkylated styrene with at least one monomer selected from a fourth group consisting of (meth)acrylonitrile, methylmethacrylate and maleic anhydride and wherein weight ratio between said monomer of said third group to monomer of said fourth group is 80:20 to about 65:35, with the proviso that said composition contains no other grafted rubber components.

2. The composition of claim 1 wherein said substrate and grafted phase relate one to the other, by weight, as 65:35 to 85:15.

3. The composition of claim 1 wherein said core is crosslinked.

4. The composition of claim 1 wherein said weight average particle size is 0.25 to 0.6 microns.

5. The composition of claim 1 wherein third group consists of p-methylstyrene.

6. The composition of claim 1 wherein third group consists of tert.butylstyrene.

7. A thermoplastic molding composition comprising
   (A) 15 to 50 percent, relative to the total weight of A and B, of a grafted rubber and
   (B) 85 to 50 percent, relative to the total weight of A and B of a matrix containing a copolymer of at least one monomer selected from a first group consisting of styrene, α-methyl styrene, ring-halogenated styrene and ring-alkylated styrene and at least one monomer selected from a second group consisting of acrylonitrile wherein weight ratio between said monomer of said first group to said monomer of said second group is in the range of 80:20 to about 65:35,
   said grafted rubber including a substrate and a grafted phase wherein said substrate and grafted phase relate one to the other, by weight, as 50:50 to 90:10, said substrate containing 5 to 20 percent, relative to the weight of the substrate, of a core (A1), and 80 to 95 percent relative to the weight of the substrate of a shell (A2), where (A1) is a core polymerized from at least one member selected from the group consisting of styrene, α-methyl styrene, ring-halogenated styrene and ring-alkylated styrene, and where (A2) denotes a crosslinked rubber shell enveloping said core, selected from the group consisting of alkyl acrylate, EPDM, EPM, and vinyl/acetate, said substrate being present in particulate form having a monomodal size distribution and a weight average particle size of about 0.2 to 1.0 microns, and where grafted phase contains a copolymer of at least one monomer selected from a third group consisting of styrene, α-methyl styrene, ring-halogenated styrene and ring-alkylated styrene with at least one monomer selected from a fourth group consisting of (meth)acrylonitrile, methylmethacrylate and maleic anhydride and wherein weight ratio between said monomer of said third group to monomer of said fourth group is 80:20 to about 65:35, with the proviso that said composition contains no other grafted rubber components.

8. The composition of claim 7 wherein said substrate and grafted phase relate one to the other, by weight, as 65:35 to 85:15.

9. The composition of claim 7 wherein said core is crosslinked.

10. The composition of claim 7 wherein said weight average particle size is 0.25 to 0.6 microns.

11. The composition of claim 7 wherein third group consists of p-methylstyrene.

12. The composition of claim 7 wherein third group consists of tert.butylstyrene.

13. The composition of claim 1 wherein said matrix containing a copolymer is styrene (meth)acrylonitrile.

14. The composition of claim 7 wherein said matrix containing a copolymer is styrene (meth)acrylonitrile.

* * * * *